United States Patent [19]

Grimes

[11] Patent Number: 5,120,104
[45] Date of Patent: Jun. 9, 1992

[54] INTEGRAL COVER FOR ARMREST ATTACHMENT OPENING

[75] Inventor: John A. Grimes, Dover, N.H.

[73] Assignee: Davidson Textron Inc., Dover, N.H.

[21] Appl. No.: 759,508

[22] Filed: Sep. 13, 1991

[51] Int. Cl.⁵ .............................................. B60N 1/02
[52] U.S. Cl. ................................... 296/153; 297/412
[58] Field of Search ................. 296/153; 297/411, 412

[56] References Cited

U.S. PATENT DOCUMENTS

| | | | |
|---|---|---|---|
| 3,015,516 | 1/1962 | Clark | 296/153 |
| 3,279,853 | 10/1966 | Cromwell et al. | 297/412 |
| 3,400,979 | 9/1968 | James | 297/412 |
| 3,620,566 | 11/1971 | Leconte | 296/153 |
| 4,165,898 | 8/1979 | Janz et al. | 296/153 |
| 4,783,114 | 11/1988 | Welch | 296/153 |

Primary Examiner—Robert R. Song
Attorney, Agent, or Firm—John P. Moran

[57] ABSTRACT

A cover for an armrest access opening to the mounting or attachment apparatus for the armrest, wherein the cover is formed of the same vinyl skin which covers the armrest and is integral therewith. The cover is a vinyl skin flap connected by a living hinge to an edge of the vinyl skin covering the armrest adjacent the access opening. A small opening is formed in the top surface of the mounting apparatus, and a plug is formed on the inner surface of the flap, adapted to fit into the small opening and support the flap once the flap is closed over the access opening.

3 Claims, 1 Drawing Sheet

INTEGRAL COVER FOR ARMREST ATTACHMENT OPENING

TECHNICAL FIELD

This invention relates generally to automotive door armrests and, more particularly, to means for covering the mounting or attachment apparatus therefor.

BACKGROUND ART

Heretofore, access openings to mounting or attachment apparati for automotive armrest assemblies have generally been covered by separate, removably mounted snap-in buttons or covers.

DISCLOSURE OF THE INVENTION

A general object of the invention is to provide an improved armrest assembly.

Another object of the invention is to provide an improved armrest assembly wherein there are no removable covering parts.

A further object of the invention is to provide an armrest assembly wherein an integral part thereof serves to cover the access opening to the mounting apparatus for the armrest.

A still further object of the invention is to provide an armrest assembly covered by a vinyl skin and including a handgrip pocket having an access opening formed in the bottom thereof for a mounting member and fastener adapted to fasten the armrest to a door frame, wherein a flap extension of the vinyl skin is connected thereto by a flexible hinge, and a snap-in type plug is formed on the inner surface of the flap extension, adapted to being snapped into an opening formed in the mounting member contained in an access opening, to thereby cover the access opening with the vinyl skin flap extension.

These and other objects and advantages of the invention will become more apparent when reference is made to the following drawings and accompanying description.

BEST MODE FOR CARRYING OUT THE INVENTION

Figure 1:
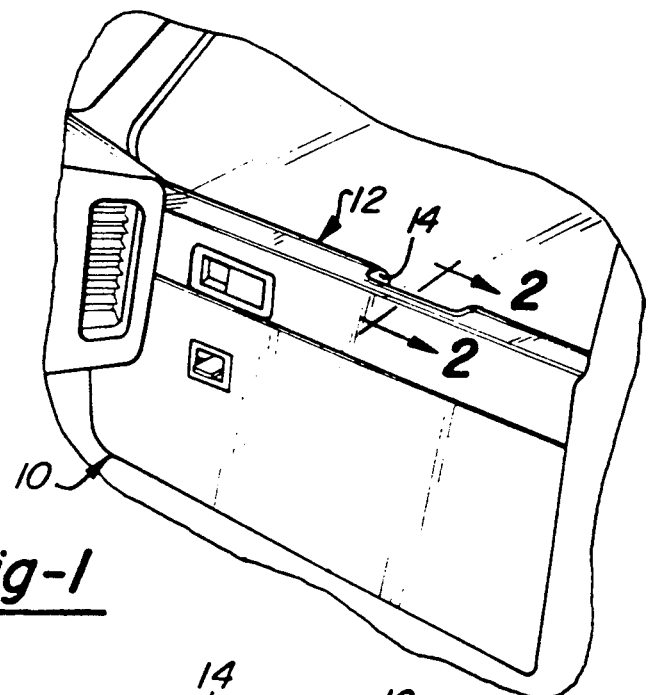
FIG. 1 is a fragmentary perspective view of an automotive door embodying the invention.
Figure 2:
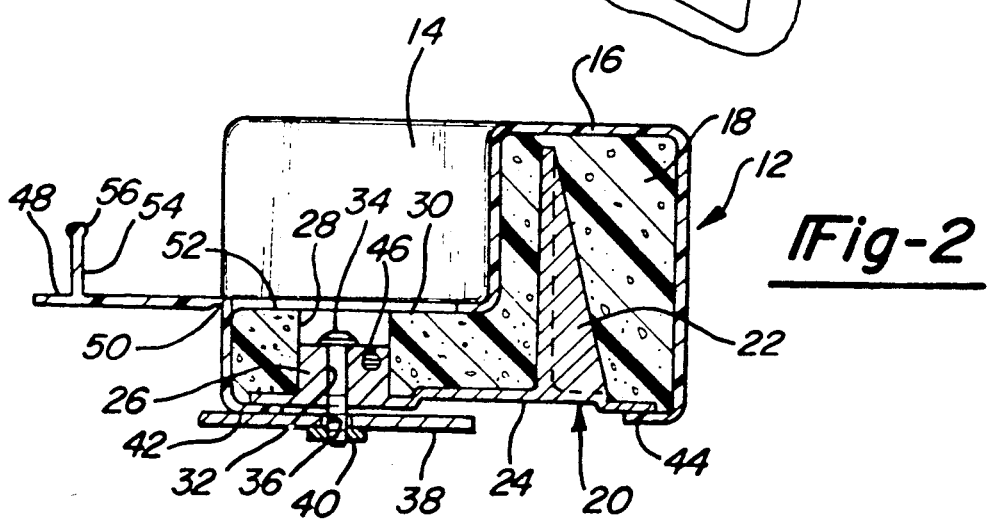
FIG. 2 is an enlarged cross-sectional view taken along the plane of the line 2—2 of FIG. 1, and looking in the direction of the arrows.
Figure 3:
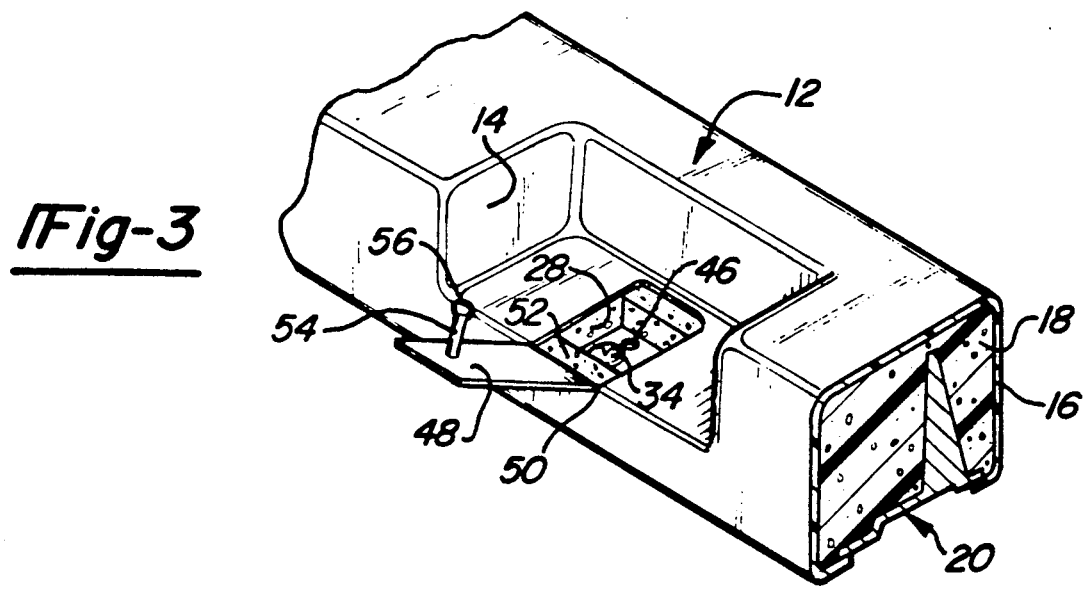
FIG. 3 is a perspective view of the FIG. 2 structure.

Referring now to the drawings in more detail, FIG. 1 illustrates the inside of an automotive door 10 having an armrest 12 mounted thereon. A handgrip pocket 14 is formed in the armrest 12 for facilitating pulling the door shut. A vinyl skin 16 covers the armrest and the surfaces of the pocket 14, as better seen in FIGS. 2 and 3.

The armrest 12 is formed of a foam material 18 molded around a bracket 20. The latter includes a support brace 22 extending upwardly from a bottom wall 24 along the length of the armrest 12, and a mounting block 26 extending upwardly from the bottom wall 24 at an intermediate location therealong. The mounting block 26 fits into a rectangular-shaped access opening 28 formed in the foam material 18 at the center of the bottom 30 of the pocket 14.

A vertical hole 32 (FIG. 2) is formed through the mounting block 26. A mounting bolt 34 extends through the hole 32 and, thence, through a hole 36 formed in a door frame 38, to threadedly connect to a suitable fastener, such as a nut 40. The peripheral edge portions 42 and 44 of the vinyl skin 16 are confined between the bottom wall 24 of the bracket 20 and the door frame 38.

A contoured opening 46 is formed in the top surface of the mounting block 26 between the hole 32 and the innermost side of the access opening 28.

A vinyl skin flap 48 is connected by a living hinge 50 to an edge of the vinyl skin 16 as an integral extension of the latter. The flap 48 size is such that it is adapted to exactly fit over the adjacent portion 52 of the foam material 18 and the access opening 28.

A plug 54 of a predetermined length, with an enlarged snap-in type head 56 formed thereon, is formed to extend perpendicularly from the inner surface of the flap 48 adjacent the free end thereof such that the head 56 is adapted to snap into the contoured opening 46 once the flap is closed over the access opening 28. In the closed flap position, the plug 54 serves to support the flap 48 on a plane with the vinyl skin 16 covering the bottom 30 of the pocket 14 as a perfect color match therein.

INDUSTRIAL APPLICABILITY

It should be apparent that, along with being a perfect color match within a handgrip pocket, the flap 48 eliminates the need for the separate snap-in button heretofor commonly used to cover mounting openings in armrests, and easily removed and misplaced.

While but one embodiment of the invention has been shown and described, other modifications thereof are possible within the scope of the following claims.

The embodiments of the invention in which an exclusive property or privilege is claimed are defined as follows:

1. For use with an armrest mounted on an automotive door frame, the armrest being formed of a foam material and covered with a vinyl skin, and having a handgrip pocket formed therein, with an access opening formed in the bottom of the pocket for receiving a mounting member, and a bolt formed through a hole in the mounting member to secure the armrest to the door frame, the improvement comprising an opening formed in the upper surface of the mounting member, and a vinyl skin flap connected by a living hinge to an edge of the vinyl skin adjacent the access opening, and having a plug formed to extend perpendicularly from the inner surface of the flap and adapted to fit into the opening and support the flap once the flap is closed over the access opening to lie on a plane with the adjacent vinyl skin on the bottom of the handgrip pocket.

2. The improvement described in claim 1 wherein the mounting member is part of a support bracket around which the foam material is molded.

3. The improvement described in claim 1 wherein said opening formed in the upper surface of the mounting member is contoured, and said plug has an enlarged, snap-in type head formed thereon for snapping into the contoured opening once the flap is closed over the access opening.

* * * * *